United States Patent Office 3,712,797
Patented Jan. 23, 1973

3,712,797
PROCESS FOR EVAPORATING NaCl BRINE TO SEPARATE NaCl CRYSTALS FROM Na₂SO₄
Robert Winkler, Wallisellen, Switzerland, assignor to Escher Wyss Limited, Zurich, Switzerland
Continuation of abandoned application Ser. No. 671,421, Sept. 28, 1967. This application Mar. 5, 1971, Ser. No. 121,530
Claims priority, application Switzerland, Oct. 17, 1966, 15,053/66
Int. Cl. B01d 9/02; C01d 3/08, 5/16
U.S. Cl. 23—296     5 Claims

ABSTRACT OF THE DISCLOSURE

Process and apparatus for evaporating NaCl brine containing $Na_2SO_4$, whereby the crystallisation of NaCl from the brine is carried out practically to saturation of the mother liquor with $Na_2SO_4$, and then the mother liquor is undersaturated with NaCl by being heated to a higher temperature, whereupon steps are taken for re-saturation of the mother liquor with NaCl, the $N_2SO_4$ then precipitating is separated, and the residual mother liquor is returned to the NaCl crystallisation process.

This application is a continuation of applicant's co-pending application Ser. No. 671,421 filed Sept. 28, 1967, now abandoned.

BACKGROUND OF THE INVENTION

The $SO_4$ portion of crude brines, even after the usual purification process, remains for the larger part in solution as $Na_2SO_4$. In order not to cause any precipitation of $Na_2SO_4$ during evaporation, the brine may be concentrated only to its saturation point. The concentrated solution must be decanted off, and may be returned to the brine purifying process only up to a certain part, depending on the chemicophysical equilibrium conditions of the said process.

In such cases, the requirement arises of drawing off the $Na_2SO_4$-enriched brine from the plant, which apart from NaCl-losses, leads to difficult effluent problems.

SUMMARY OF THE INVENTION

The underlying problem of the invention is to dispense with external decantation, and to precipitate $Na_2SO_4$ practically separate from NaCl.

This problem is solved according to the invention in that the crystallisation of NaCl from the brine is carried out practically to saturation of the mother liquor with $Na_2SO_4$, and the mother liquor is then undersaturated with NaCl by being heated to a higher temperature, whereupon steps are taken for re-saturation of the mother liquor with NaCl, the then precipitated $Na_2SO_4$ is separated, and the residual mother liquor is returned to the NaCl crystallisation process.

The invention makes use of the circumstance that the solubility behaviours of NaCl and $Na_2SO_4$ vary inversely of each other with fluctuating temperature. With increasing temperature the solubility of NaCl rises and the solubility of $Na_2SO_4$ falls and vice versa.

BRIEF DESCRIPTION OF THE DRAWINGS

Embodiment examples of apparatuses according to the invention for carrying out the process according to the invention are illustrated in simplified form in the drawings, in which.

The process will also be explained more fully in connection with the explanation of the embodiment examples.

DESCRIPTION OF THE PREFERRED EMBODIMENTS

Figure 1:
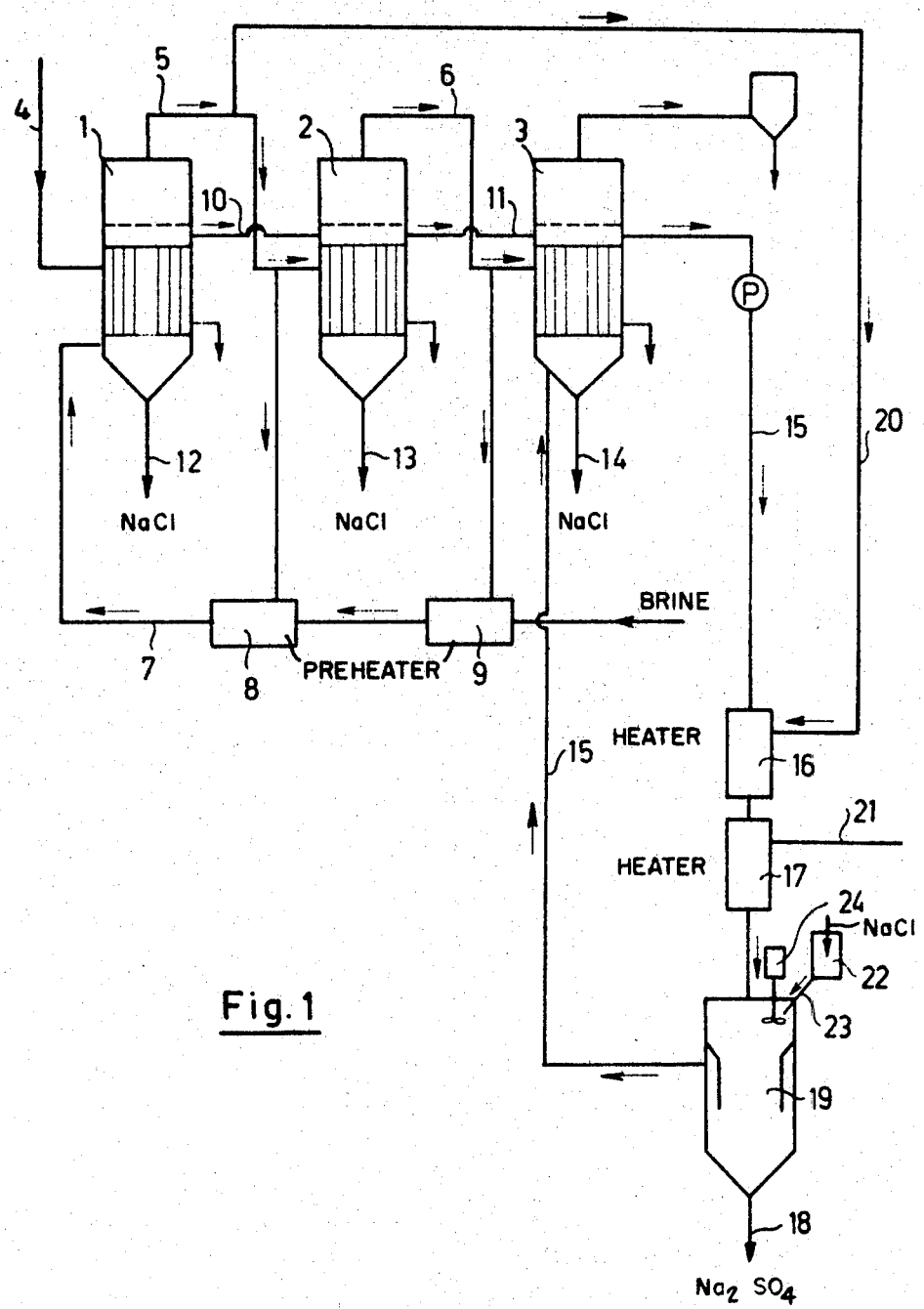
FIGS. 1 and 2 show diagrammatically respective embodiment examples.

The apparatus shown in FIG. 1 for the evaporation of the brine and crystallisation of NaCl possesses three evaporators 1, 2, 3 connected in series on the principle of an ordinary multiple-effect plant, the evaporator 1 being heated with live steam by a pipe 4, and the following evaporators 2, 3 being heated by way of pipes 5, 6 with the evaporation vapour of the respectively preceding evaporator. The $Na_2SO_4$-containing brine to be evaporated is supplied to the evaporator 1 by a pipe 7, in which are inserted the preheaters 8 and 9 connected respectively to the pipes 5 and 6. Pipes 10 and 11 serve respectively for transferring the mother liquor of the brine from evaporator 1 to evaporator 2 and from evaporator 2 to evaporator 3. The NaCl, crystallised out in the evaporators 1, 2, 3 can be withdrawn through pipes 12, 13, 14. The mother liquor leaves the evaporator 3 through a pipe 15, in the flow path of which are included heaters 16 and 17, and a settling vessel 19 following said heaters in the direction of flow of the mother liquor and provided with a pipe 18. The pipe 15 afterwards opens into the evaporator 3. The heater 16 is heated with vapour of the evaporator 1 by way of a pipe 20, and the heater 17 is heated with live steam by way of a pipe 21. In the direction of flow of the mother liquor and after the heaters 16, 17, a feed pipe 23 from the feed device 22 opens into the flow path of the mother liquor, a mixing device 24 being provided at the outlet end of the feed pipe 23.

The evaporation process is so designed that crystallisation of NaCl from the brine in the evaporators 1, 2, 3 is carried out practically to saturation of the mother liquor with $Na_2SO_4$. The mother liquor thus saturated flows in the pipe 15 to the heaters 16 and 17 and is heated in them to a higher temperature, being thereby undersaturated with NaCl. Steps are thereupon taken for re-saturation of the mother liquor with NaCl. The means for this are the feed device 22 and the feed pipe 23, through which NaCl is added to the heated mother liquor. The $Na_2SO_4$ precipitated on re-saturation with NaCl settles in the settling vessel 19 and may be withdrawn through the pipe 18. The settling vessel 19 at the same time serves as device for separating the precipitated $Na_2SO_4$ from the mother liquor. The residual mother liquor is resupplied in the flow path of pipe 15 to the NaCl crystallisation process taking place in the evaporators 1, 2, 3, this resupply occurring at a point in the evaporator 3.

In the embodiment example, the temperature of the mother liquor in the evaporator 1 is about 100° C. in the evaporator 22 about 75° and in the evaporator 3 about 50° C. In the heaters 16 and 17, the mother liquor is heated to 100° C., at which temperature re-saturation with NaCl takes place in the settling vessel 19.

Figure 2:
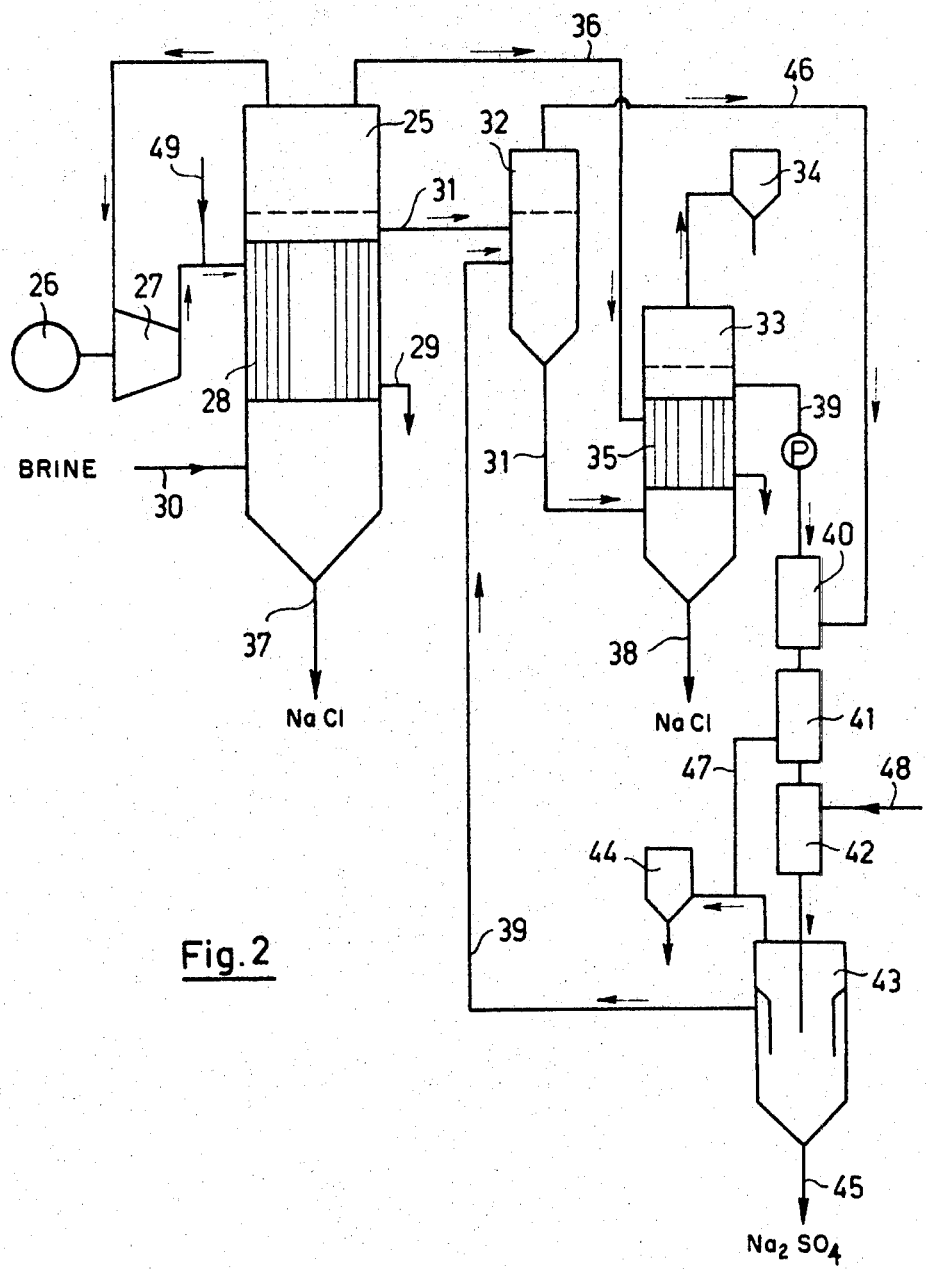

In the apparatus shown in FIG. 2, for evaporating the brine and crystallising the NaCl, a thermo-compression evaporator 25 is used, the evaporation vapour of which is compressed in a compressor 27 driven by a motor 26, and serves to heat the hot part 28 of the evaporator 25. At 29 is shown a condensate pipe. The brine to be evaporated enters the evaporator 25 through a pipe 30. The mother liquor leaves the evaporator 25 through a pipe 31, in which is incorporated an expansion evaporator 32. The pipe 31 then leads to a re-evaporator 33, the vapour space of which is connected to a condenser 34. The heating part 35 of the evaporator 33 is heated by way of a pipe 36 with vapour of the evaporator 25. The NaCl crystallised out in the evaporaor 25 and re-evaporator 33 leaves the evaporators 25 and 33 by pipes 37 and 38, respectively.

The re-evaporator 33 and expansion evaporator 32 follow the thermo-compression evaporator 25 in the direction of flow of the mother liquor, in order that in the thermo-compression evaporator 25 it is possible to employ high temperatures favourable to this process, in the embodiment example a temperature of 110° C. of the mother liquor. In the expansion evaporator 32, the mother liquor is expansion evaporated to 75° C. and is re-evaporated at 40° C. in the re-evaporator, so that the evaporated mother liquor, practically saturated with $Na_2SO_4$, leaves the NaCl crystallisation process at a low temperature favourable for its futher treatment.

The mother liquor passes from the re-evaporator 33 through a pipe 39 in which are connected heaters 40, 41, 42 and an expansion evaporator 43, following the said heaters in the direction of flow of the mother liquor, with vapour condenser 44 and a pipe 45. The pipe 39 then opens into the expansion evaporator 32. The heater 40 is heated by vapour from the expansion evaporator 32 by way of a pipe 46, the heater 41 by vapour of the expansion evaporator 43 by way of a pipe 47, and the heater 42 is heated with live steam by way of a pipe 48. At 49 is shown a pipe for the supply of live steam to the heating part 28 of the thermo compression evaporator 25.

The NaCl crystallising process in the evaporators 25 and 33 is again so designed that the mother liquor leaving the re-evaporaor 33 has practically reached saturation with $Na_2SO_4$. This mother liquor is undersaturated with NaCl by being heated to a higher temperature in the heaters 40, 41, whereupon steps are again taken for re-saturation of the mother liquor with NaCl, that is further evaporation, namely expansion evaporation, is carried out. For this purpose, the mother liquor leaving the heater 41 is heated further in the heater 42, whereupon it is partly evaporated in the expansion evaporator 43 at a lower temperature. $Na_2SO_4$ is precipitated in the resulting re-saturation with NaCl. The temperature at which this evaporation takes place is, however, kept above the temperature at which NaCl would precipitate.

The mother liquor, which as already mentioned, leaves the re-evaporator 33 at about 40° C., is raised to about 75° C. in the heaters 40, 41 and to about 130° C. in the heater 42, whereupon expansion evaporation takes place in the expansion evaporator at a mother-liquor temperature of about 90° C. Due to the low temperature of the mother liquor leaving the re-evaporator 33, the maximum temperature of the entire process occurring in the heater 42 may be kept at not too high a value, i.e., at a favourable value.

Instead of the single-stage heating and expansion evaporation in the heaters 40, 41, 42 and the succeeding expansion evaporator 43, a multistage arrangement may be selected for reducing the steam consumption, i.e. two or more heater-with-succeeding-expansion-evaporator groups may be provided in series in the direction of flow of the mother liquor.

I claim:
1. A process for separating NaCl and $Na_2SO_4$ from an NaCl brine containing $Na_2SO_4$ comprising the steps of:
   (a) evaporating water from said brine to effect precipitation of NaCl and to increase the concentration of $Na_2SO_4$ therein;
   (b) terminating evaporation and NaCl precipitation when the mother liquor produced thereby is slightly undersaturated with $Na_2SO_4$;
   (c) heating said mother liquor to a temperature higher than the temperature prevailing at termination of evaporation, whereby the mother liquor becomes unsaturated with NaCl;
   (d) then treating the heated mother liquor to increase the concentration of NaCl to a level such that, at the then prevailing elevated temperature, the thus treated mother liquor has a smaller capacity for dissolving $Na_2SO_4$ than the mother liquor issuing from the evaporation step, whereby $Na_2SO_4$ is caused to precipitate; and
   (e) returning the residual mother liquor to the brine undergoing evaporation.
2. The process according to claim 1, wherein said treating comprises adding NaCl to said mother liquor.
3. The process according to claim 1, wherein the treating comprises further evaporating said mother liquor.
4. The process according to claim 3, wherein said further evaporating is obtained by expansion evaporation.
5. The process according to claim 3, wherein the temperature at which said further evaporating is carried out is kept above the temperature at which NaCl precipitates.

References Cited

UNITED STATES PATENTS

| | | | |
|---|---|---|---|
| 668,671 | 2/1901 | Baker | 23—303 |
| 1,468,389 | 9/1923 | Morse | 23—38 |
| 1,697,336 | 1/1929 | Yngve | 23—42 |
| 1,873,251 | 3/1932 | Allen | 23—303 |
| 2,125,624 | 8/1938 | Davis | 23—121 |
| 2,374,004 | 4/1945 | Ebert | 23—121 |
| 2,863,501 | 12/1958 | Farnesworth | 23—26 |
| 3,268,289 | 8/1966 | Macey | 23—38 |
| 3,484,195 | 12/1969 | Lewis et al. | 23—121 |

NORMAN YUDKOFF, Primary Examiner

R. T. FOSTER, Assistant Examiner

U.S. Cl. X.R.

23—298, 303, 302, 38, 42